United States Patent
Balfe (10) Patent No.: US 8,365,194 B2
(45) Date of Patent: Jan. 29, 2013

(54) CREATING AND PROCESSING DYNAMIC PROXY ACTIONS FOR ACTIONS THAT ARE NOT YET REGISTERED WITH A CLIENT SIDE BROKER

(75) Inventor: Robert A. Balfe, Whitesboro, NY (US)

(73) Assignee: International Business Machines Corporation, Armonk, NY (US)

( * ) Notice: Subject to any disclaimer, the term of this patent is extended or adjusted under 35 U.S.C. 154(b) by 994 days.

(21) Appl. No.: 11/927,504

(22) Filed: Oct. 29, 2007

(65) Prior Publication Data

US 2009/0113449 A1 Apr. 30, 2009

(51) Int. Cl.
 *G06F 9/54* (2006.01)
(52) U.S. Cl. ........ 719/314; 719/316; 719/329; 719/330; 719/332
(58) Field of Classification Search .................. None
 See application file for complete search history.

(56) References Cited

U.S. PATENT DOCUMENTS

| 5,887,167 | A | 3/1999 | Sutton | |
|---|---|---|---|---|
| 6,421,716 | B1* | 7/2002 | Eldridge et al. | 709/219 |
| 6,842,906 | B1 | 1/2005 | Bowman-Amuah et al. | |
| 7,076,327 | B1* | 7/2006 | Desai et al. | 700/214 |
| 7,827,152 | B1* | 11/2010 | Gangasharan et al. | 707/686 |
| 2002/0013803 | A1 | 1/2002 | King et al. | |
| 2003/0055862 | A1* | 3/2003 | Bhat | 709/101 |
| 2004/0002958 | A1 | 1/2004 | Seshadri et al. | |
| 2004/0249950 | A1* | 12/2004 | Christensen et al. | 709/227 |
| 2005/0102675 | A1* | 5/2005 | Parkyn | 718/102 |
| 2006/0080394 | A1 | 4/2006 | Goodman et al. | |
| 2006/0168122 | A1* | 7/2006 | Acharya et al. | 709/219 |
| 2007/0043825 | A1 | 2/2007 | Chouanard et al. | |
| 2008/0091812 | A1* | 4/2008 | Lev-Ran et al. | 709/223 |

FOREIGN PATENT DOCUMENTS

| WO | WO 0116668 A2 | 3/2001 |
|---|---|---|
| WO | WO 0239351 A2 | 5/2002 |

\* cited by examiner

*Primary Examiner* — H. S. Sough
*Assistant Examiner* — Umut Onat
(74) *Attorney, Agent, or Firm* — David A. Dagg (57) ABSTRACT

A system using proxy actions to handle requests for actions that are not yet registered with a broker. When an action request is received and the action is not registered in the broker, a proxy action object is created and stored on a proxy action queue. Proxy action objects stored on the queue are read periodically and a check is made as to whether the actions they refer to have been registered yet. If an action for a queued proxy action object has been registered, the action request represented by the proxy action object delivered to the appropriate service provider component. If a proxy action object remains on the proxy action queue without the corresponding action being registered before a corresponding proxy action queue element lifetime timer expires, the proxy action object is removed from the proxy action queue without the action being performed.

15 Claims, 5 Drawing Sheets

CREATING AND PROCESSING DYNAMIC PROXY ACTIONS FOR ACTIONS THAT ARE NOT YET REGISTERED WITH A CLIENT SIDE BROKER

FIELD OF THE INVENTION

The disclosed system relates generally to systems for providing effective multi-component application execution in a computer system, and more specifically to a method and system of creating and processing dynamic proxy actions for processing received actions that are not registered with a client side broker.

BACKGROUND OF THE INVENTION

As it is generally known, in modern computer systems, a computer application may include or employ multiple application components. For example, applications referred to as "composite applications" combine or make available multiple services from multiple applications. In existing systems, services provided through a composite application may consist of functionality drawn from components in a service oriented architecture (SOA). Components may be individual Web services, selected functions from within other applications, and/or entire systems whose outputs have been packaged as Web services.

Portlets are one example of components that may be connected within a composite application for run time communications. Portlets are typically user interface components that are managed and displayed in a Web portal. For example, a Web portal page is typically displayed as a collection of non-overlapping portlet display areas (sometimes referred to as "windows"), in which each portlet display area is a user interface object for a corresponding portlet. A collection of portlets provided in a portal page may be considered a type of Web-based composite application. Some common examples of component applications that may be provided through portlets are electronic mail ("e-mail"), weather reports, discussion forums, and news.

Web containers, as used in the Java 2 Platform, Enterprise Edition ("J2EE"), are another example of components that may be connected to each other and/or to other components within a composite application.

One example of software connections that facilitate run time communication between application components are application developer defined "wires". Wires are declarative connections defined by a composite application programmer at program development time, and created by the run time environment (e.g. assembler or the like) at run time. Application component wiring defines and enables run-time, cross-component communications. Wires define the communication between components, e.g. how an event is conveyed from a producer of the event to the consumer of the event. Events conveyed from a producer component to a consumer component through a wire may, for example, include things such as changes to a property value in the producer component, etc.

In existing composite application systems, one or more service provider components create corresponding Web services that are registered to a service registry. Each service provider component exposes one or more services through registered actions that may be accessed by service requester components after the actions have been registered with a service broker. Service registry registrations may identify and/or describe relevant interface and access information for the component and/or its services. The service broker (also referred to as a "service registry", "property broker", etc.) makes the registered Web service available to the service requestor components.

A problem with existing systems occurs as a result of service provider components registering the actions they support with the service broker when they are initialized. Since it may be desirable to initialize service provider components on an "as needed" basis, a specific service provider component, and accordingly its constituent actions, may not be available at any given time. For example, it may be desirable for a system to operate such that a service provider component is not initialized until a request is issued for one of the actions it provides. However, this approach may result in performance problems at execution time when a first action request is issued for a service provider component, and that service provider component has not yet been initialized. In such a case, the requested action would not yet have been registered with the service broker, and the system would have to be paused while the service provider component is initialized, until the action has been registered by the service provider component, and the service broker can then process the action request from the service requester. During this pause while the service provider component initializes, delays may occur, e.g. the user may be prevented from controlling the cursor, the user interface may stop refreshing the screen (e.g. a new window for the requested service would be presented only as a white box), and so on. Such delays are frustrating and time consuming for the user, and it would be desirable to have a new system that eliminates them.

SUMMARY OF THE INVENTION

To address the above described and other shortcomings of previous techniques, a new method and system are disclosed for dynamically creating and processing proxy actions to handle received actions that are not yet registered with a client side broker. In the disclosed system, when an action request is received from a component, and the action is not registered in the broker, a proxy action object is created and stored on a proxy action queue. The proxy action object remains stored on the proxy action queue for a predetermined time period (e.g. the "proxy action queue element lifetime"). Accordingly, when each proxy action object is stored on the proxy action queue, a proxy action queue element lifetime timer is started for that queue element. The proxy action queue is traversed periodically, such that all proxy action objects stored on the queue are read, and the broker registry is checked to determine whether the requested actions the queue elements refer to have been registered yet. In the event that an action for a proxy action object on the proxy action queue has been registered, the proxy action object is removed from the queue, and the action request represented by that proxy action object delivered to the appropriate service provider component using the information provided in the action registration, such that the action request appears to the receiving component as if it were received directly from the originally requesting component. If a proxy action object remains on the proxy action queue without the corresponding action being registered before its queue element lifetime timer expires, then the proxy action object is removed from the proxy action queue, and the requested action is not performed.

Thus there is disclosed a new system for dynamically creating and processing proxy actions to handle received actions that are not yet registered with a client side broker. The disclosed system advantageously allows service provider components to "lazily" register their actions and properties, e.g. when their component becomes activated, as opposed to requiring that such registration be performed during startup of the underlying application platform (e.g. an Eclipse application framework).

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
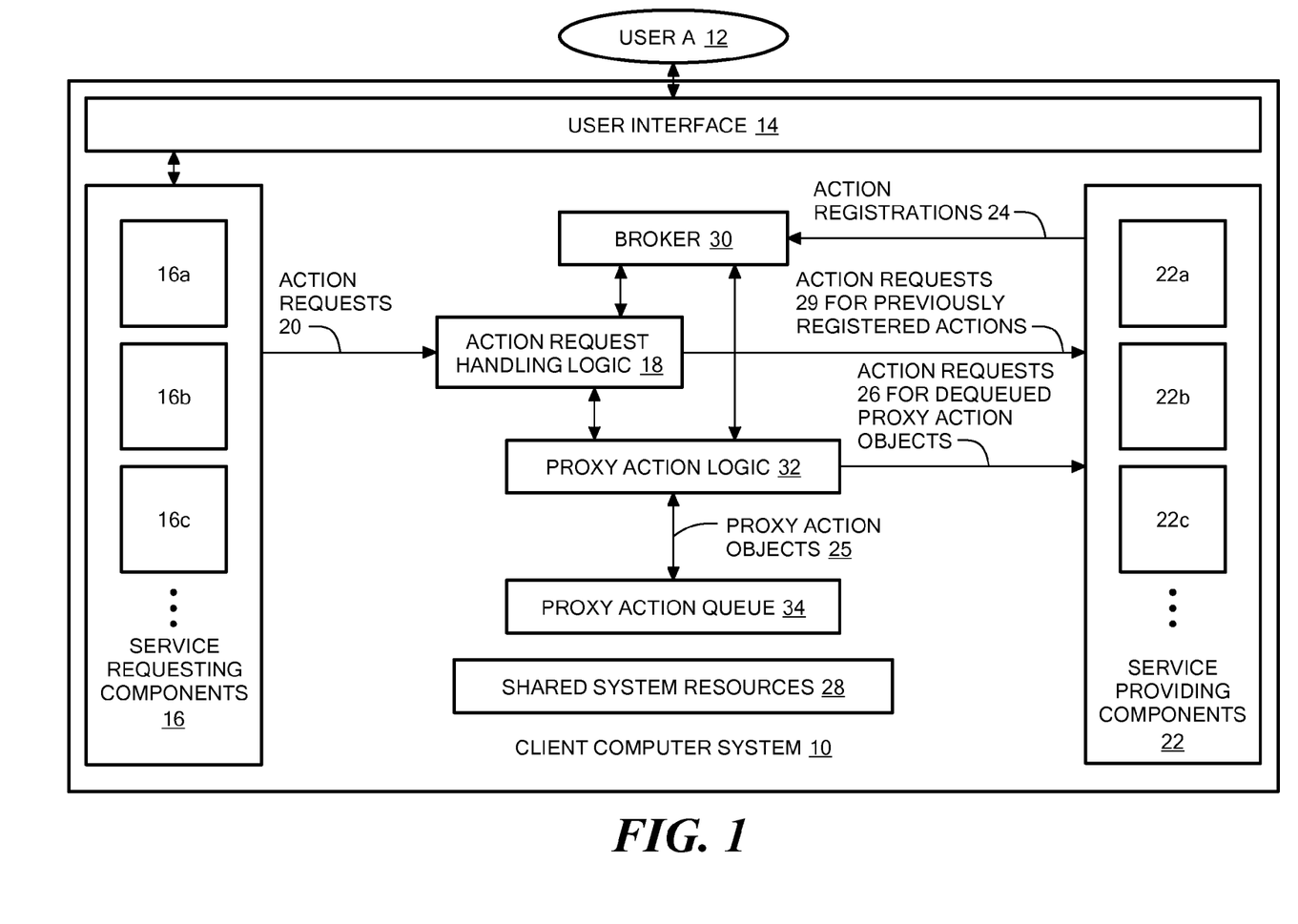
FIG. 1 is a block diagram showing hardware and/or software components in an illustrative embodiment of the disclosed system.

FIG. 1 is a block diagram showing hardware and/or software components in an illustrative embodiment of the disclosed system. As shown in FIG. 1, a Client Computer System 10 provides a User Interface 14 (e.g. Graphical User Interface) to a local user User A 12. The Client Computer System 10 of FIG. 1 is shown including a number of Service Requesting Components 16 (e.g. 16a, 16b, 16c, etc.) and a number of Service Providing Components 22. During operation of the illustrative embodiment shown in FIG. 1, the Service Requesting Components 16 issue Action Requests 20 for actions to the Action Request Handling Logic 18. The Action Requests 20 may, for example, be events thrown in the Service Requesting Components 16 as a result of changes to values of properties in the Service Requesting Components 16 that are declaratively connected (e.g. using a software connections referred to as "wires" that are created at run time by the run time environment) to actions provided by the Service Providing Components 22.

Upon receipt of each of the Action Requests 20, the Action Request Handling Logic 18 searches the Broker 30 to determine if the requested action is registered. If an action is registered in the Broker 30, its registration can be found by searching an action registry in the Broker 30 based on the action name or identifier (and optionally also based on a name or identifier of the service providing component that handles the action). An action registration in the Broker 30 identifies and/or describes the one of the Service Providing Components 22 that will handle the requested action, and/or provides indication that such a service provider component is currently available to perform requested actions (e.g. initialized and running).

As each of the Service Providing Components 22 is initialized, it registers the actions it performs with the Broker 30, as shown by Action Registrations 24. Advantageously, through operation of the disclosed system, each of the Service Providing Components 22 can delay its initialization until it is needed (e.g. until a request is issued for an action that it handles), without adversely affecting the performance of the overall system at the time of the component's first use.

For requested actions that have previously been registered in the Broker 30 when they are received (e.g. those requested actions provided by Service Providing Components 22 that have previously been used, and accordingly have previously been initialized), the Action Request Handling Logic 18 generates Action Requests 29 for Previously Registered Actions to the appropriate ones of the Service Providing Components 22 (e.g. as identified and/or described by action registrations found in Broker 30). When a registration for a requested action is not found in the Broker 30 by the Action Request Handling Logic 18, the Action Request Handling Logic 18 triggers the Proxy Action Logic 32 to create a proxy action object describing the received action request (e.g. including a name or identifier of the one of the Service Requesting Components 16 that originated the request, a name or identifier of the requested action, a name or identifier of the one of the Service Providing Components 22 that is to handle the requested action, and/or one or more parameters to be passed to the one of the Service Providing Components 22 that handles the requested action, etc.). The proxy action objects created by the Proxy Action Logic 32 are stored on the Proxy Action Queue 34, as shown in FIG. 1 by the Proxy Action Objects 25 passed from the Proxy Action Logic 25 to the Proxy Action Queue 34. Initialization of the one of the Service Providing Components 22 that will handle the requested action is also begun in response to the determination that the requested action is not registered in the Broker 30, and such initialization is performed as a background job, e.g. in a relatively low priority execution "thread" that executes in parallel with regard to one or more other jobs or tasks performed on the Client Computer System 10, where a thread is a sequence of executable instructions that may execute in parallel with other threads.

When initialization of the one of the Service Providing Components 22 is begun as a background job, it enables one or more of the Shared System Resources 28 to be shared with other jobs or tasks performed in parallel execution threads on the Client Computer System 10. Such other jobs or tasks may, for example, consist of jobs or tasks that provide the user with control of the cursor in the User Interface 14 of Client Computer System 10, and/or allow the user to access user interface display objects presented in the User Interface 14. The Shared System Resources 28 include processor and/or other resources of the Client Computer System 10 that are used to execute threads.

After a proxy action object is stored by the Proxy Action Logic 32 onto the Proxy Action Queue 34, also in parallel with initialization of the service providing component that will handle the requested action for the proxy action object, the Proxy Action Logic 32 executes a proxy action job (see FIG. 5) that periodically traverses the Proxy Action Queue 34 to determine if any of the requested actions of proxy action objects stored in queue elements of the Proxy Action Queue 34 have been registered. When a registration of requested action for a proxy action object enqueued in a queue element of the Proxy Action Queue 34 is detected by the Proxy Action Logic 32, then the proxy action object is dequeued from the Proxy Action Queue 34, and the action request represented by the proxy action object is issued to the one of the Service Providing Components 22 that registered the action (e.g. in Action Requests 26 for Dequeued Proxy Action Objects), as if the request were being conveyed directly from the one of the Service Requesting Components 16 that originally issued the action request.

Those skilled in the art will recognize that the Service Requesting Components 16 and Service Providing Components 22 may be any specific type of component that may be part of a composite application, including Portals, Web containers, etc. Moreover, the Broker 30 may be any specific type of broker operable to register actions by those components operable to perform them, such as a service broker, service registry, property broker, or the like.

The Client Computer System 10 of FIG. 1 may be any specific type of a computer system or intelligent electronic device, such as a desktop, laptop, or palmtop computer system, or a personal digital assistant, cell phone, or other electronic device. The Client Computer System 10 includes or controls a display device capable of displaying a graphical user interface (e.g. including the User Interface 14) to a local user (e.g. User A 12), such as a liquid crystal display (LCD), cathode ray tube (CRT), interferometric modulator display (IMOD), light emitting diode (LED), or the like.

Those skilled in the art will further recognize that the Service Requesting Components 16, Service Providing Components 22, Broker 30, Action Request Handling Logic 18, and Proxy Action Logic 32 of FIG. 1 may be embodied using software or firmware, such as computer application program code, operating system program code, middleware, and/or wholly or partly using digital hardware components, such as application specific integrated circuits (ASICs), field-programmable gate arrays (FPGAs), and the like, and/or combinations of hardware and/or software or firmware. Those skilled in the art will further recognize that the Client Computer System 10 of FIG. 1 may include one or more processors, and program storage, such as memory, for storing program code executable on such processors, as well as input/output devices and/or interfaces. In the example of FIG. 1, the Client Computer System 10 may be interconnected to a data communication network (e.g. the Internet, a Local Area Network, etc.) using one or more of such input/output devices or interfaces, and through which may further be provided communication to a number of other client systems and/or remote server systems. Accordingly, the Service Providing Components 22 may be served from such remote server systems, and initialization of a given one of the Service Providing Components 22 may include downloading the component from a remote server system.

Figure 2:
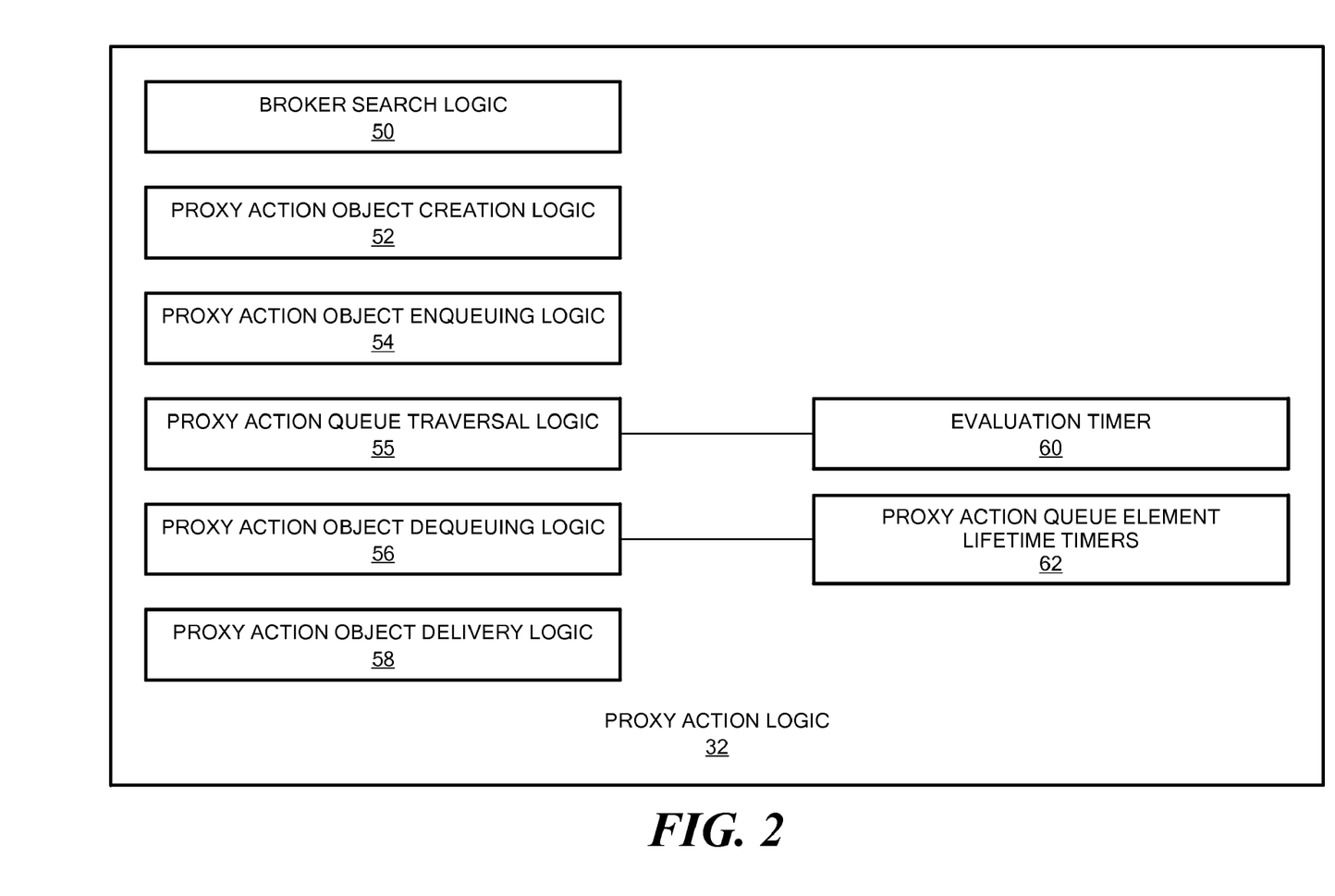
FIG. 2 is a block diagram showing the structure of the proxy action logic of FIG. 1 in an illustrative embodiment.

FIG. 2 is a block diagram showing the structure of the Proxy Action Logic 32 of FIG. 1 in an illustrative embodiment. As shown in FIG. 2, Proxy Action Logic 32 includes Broker Search Logic 50 for searching the Broker 30 for action registrations. Proxy Action Object Creation Logic 52 creates proxy action objects as needed for enqueueing to the Proxy Action Queue 34 by the Proxy Action Enqueueing Logic 54. Proxy Action Queue Traversal Logic 55 periodically traverses the entries on the Proxy Action Queue in response to the Evaluation Timer 60. For example, the period of the Evaluation Timer 60 may be equal to 100 milliseconds, resulting in the Proxy Action Queue 34 being traversed by the Proxy Action Queue Traversal Logic 55 every 100 milliseconds. The Proxy Action Object Dequeueing Logic 56 operates to dequeue proxy action objects from the Proxy Action Queue 34 in response to the Broker Search Logic 50 detecting an action registration for a requested action associated with a proxy action object, and in response to expiration of one of the Proxy Action Queue Element Lifetime Timers 62 associated with a queue element storing the proxy action object. Individual ones of the Proxy Action Queue Element Lifetime Timers 62 are created and started by the Proxy Action Object Enqueueing Logic 54 as each proxy action object is enqueued to the Proxy Action Queue 34. For example, the time period for the Proxy Action Queue Element Lifetime Timers 62 may be 5 minutes, or any other specific time period.

When the Proxy Action Object Dequeueing Logic 56 dequeues a proxy action object from the Proxy Action Queue 34, the action request represented by the proxy action object is delivered to the one of the Service Providing Components 22 that registered the action by the Proxy Action Object Delivery Logic 58.

Figure 3:
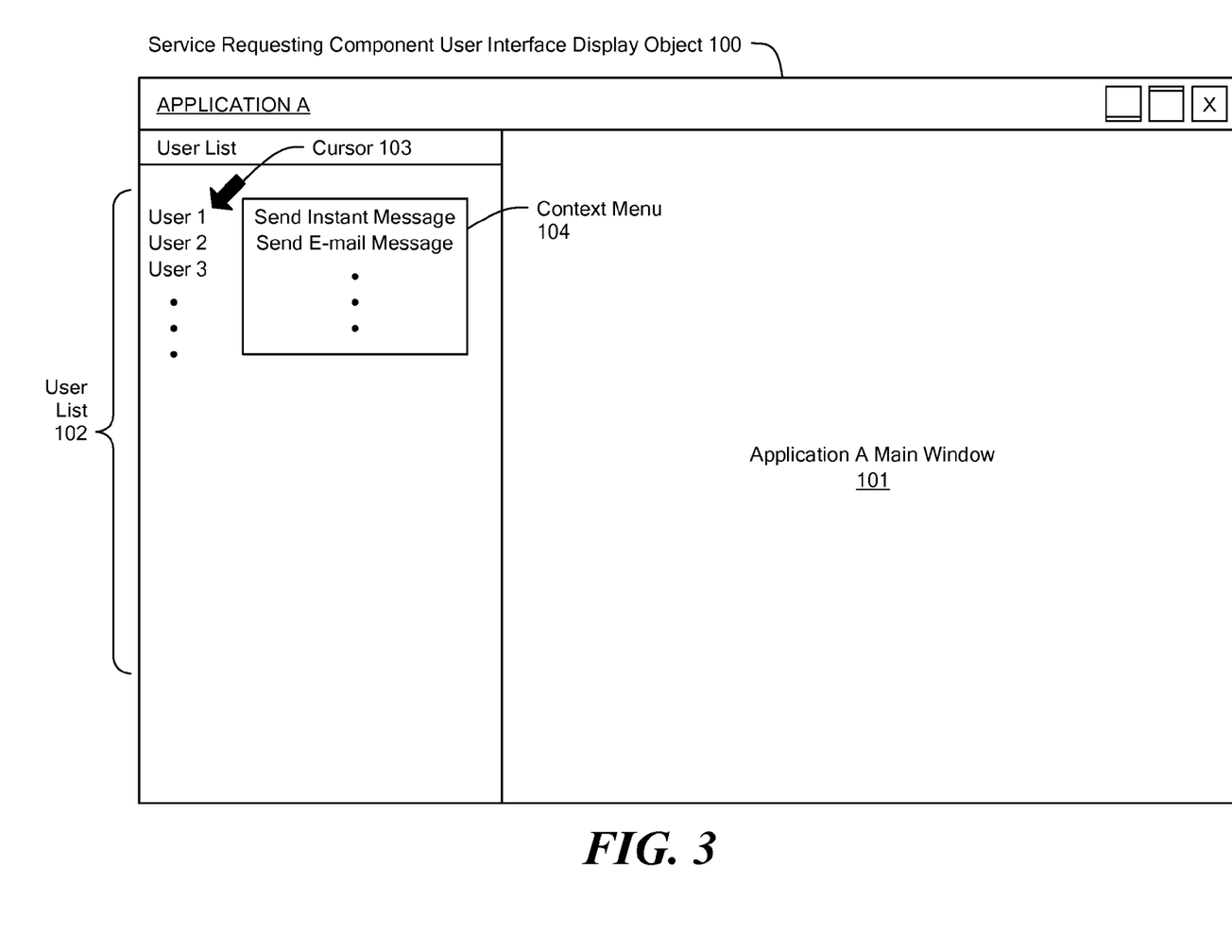
FIG. 3 is a simplified screen shot showing a portion of a user interface provided by a first component.

FIG. 3 is a simplified screen shot showing a portion of a user interface provided by a first component. As shown in FIG. 3, a Service Requesting Component User Interface Display Object 100 includes a User List 102 of users (e.g. User 1, User 2, User 3, etc.), and a main window referred to as Application A Main Window 101. When a user moves the Cursor 103 over one of the users in the User List 102 (e.g. User 1), and then performs a right click or the like, a Context Menu 104 is displayed including a number of menu options relating to contacting the user (e.g. Send Instant Message, Send E-mail Message, etc.). In an embodiment of the disclosed system, when the user selects (e.g. clicks on) the Send E-mail Message option in the Context Menu 104, the component providing the Service Requesting Component User Interface Display Object 100 determines that a "wire" connects the selected menu option to an electronic mail application component that handles the action of sending a message to User 1. In the event that the electronic mail component has not been initialized, and accordingly has not registered the send message action in the broker, the disclosed system creates a proxy action object for the action request, identifying the service requesting component and the requested action, and potentially also including parameters for the request, such as the user name and/or e-mail address of the local user to be loaded into the From: field of the message creation form (or to be used to look up a corresponding e-mail address to loaded into the From field), and/or the user name of the recipient user (e.g. User 1) to be loaded into the To: field of the message creation form (or to be used to look up a corresponding e-mail address to be loaded into the To: field). After the disclosed system enqueues the proxy action object onto the proxy action queue and triggers background initialization of the electronic mail application component, control of the Cursor 103 is returned to the user, so that other user-selected tasks or operations (e.g. as may be available in Application A Main Window 101) can be performed while the electronic mail application component is initialized in parallel.

Figure 4:
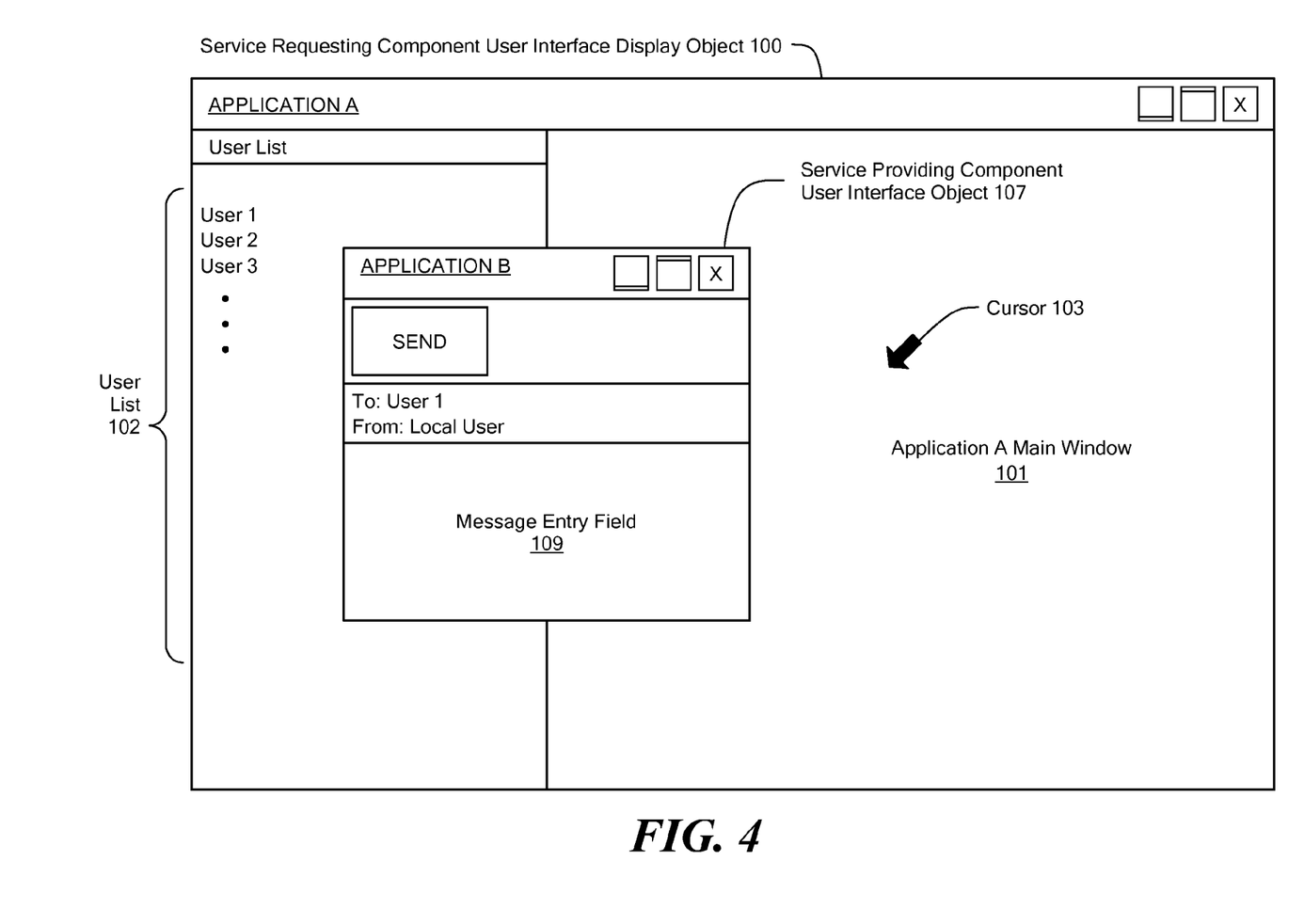
FIG. 4 is a simplified screen shot including a portion of a user interface provided by a second component accessed by a user through the first component shown in FIG. 3, after the second component has completed initialization, registered the requested action, and performed the requested action based on the contents of a dequeued proxy action object.

FIG. 4 is a simplified screen shot including a portion of a user interface provided by a second component accessed by a user through the first component shown in FIG. 3, after the second component has completed initialization, registered the requested action, and performed the requested action based on the contents of a dequeued proxy action object. As shown in FIG. 4, the electronic mail application component has completed its initialization, registered the action that was requested in FIG. 3 to open up a message composition window (e.g. Service Providing Component User Interface Object 107) and populate the To: and From: fields with the parameters received from the service requesting component (e.g. Application A). The user is now able to access the Message Entry Field 109 to enter the body of the message to be sent to User 1.

While the example of FIGS. 3 and 4 involves a service providing component that is an electronic mail application, the disclosed system is not limited to that implementation. Accordingly, any other specific service requesting component and/or service providing component may be used. For example, in another embodiment, the service providing component is a data base application component through which a background database replication action can be performed. When a service requesting component is wired to the background database replication action provided by the database application, and the user or a program causes the service requesting component to issue a request for the background replication action provided by the database application before the database application has been initialized, the disclosed system creates a proxy action object for the replication request, enqueues the proxy action object to the proxy action queue, triggers the initialization of the database application as a background job, and then returns control of the cursor in the user interface to the user to allow other user selected tasks or operations to be performed in parallel with the background initialization of the database program. After initialization of the database application is completed and the background replication action has been registered, the proxy action object is dequeued and the replication action begun as a background job performed by the database application. Thus, as a result, the database replication is completely performed in the background, including the initialization of the database application that performs the replication.

Figure 5:
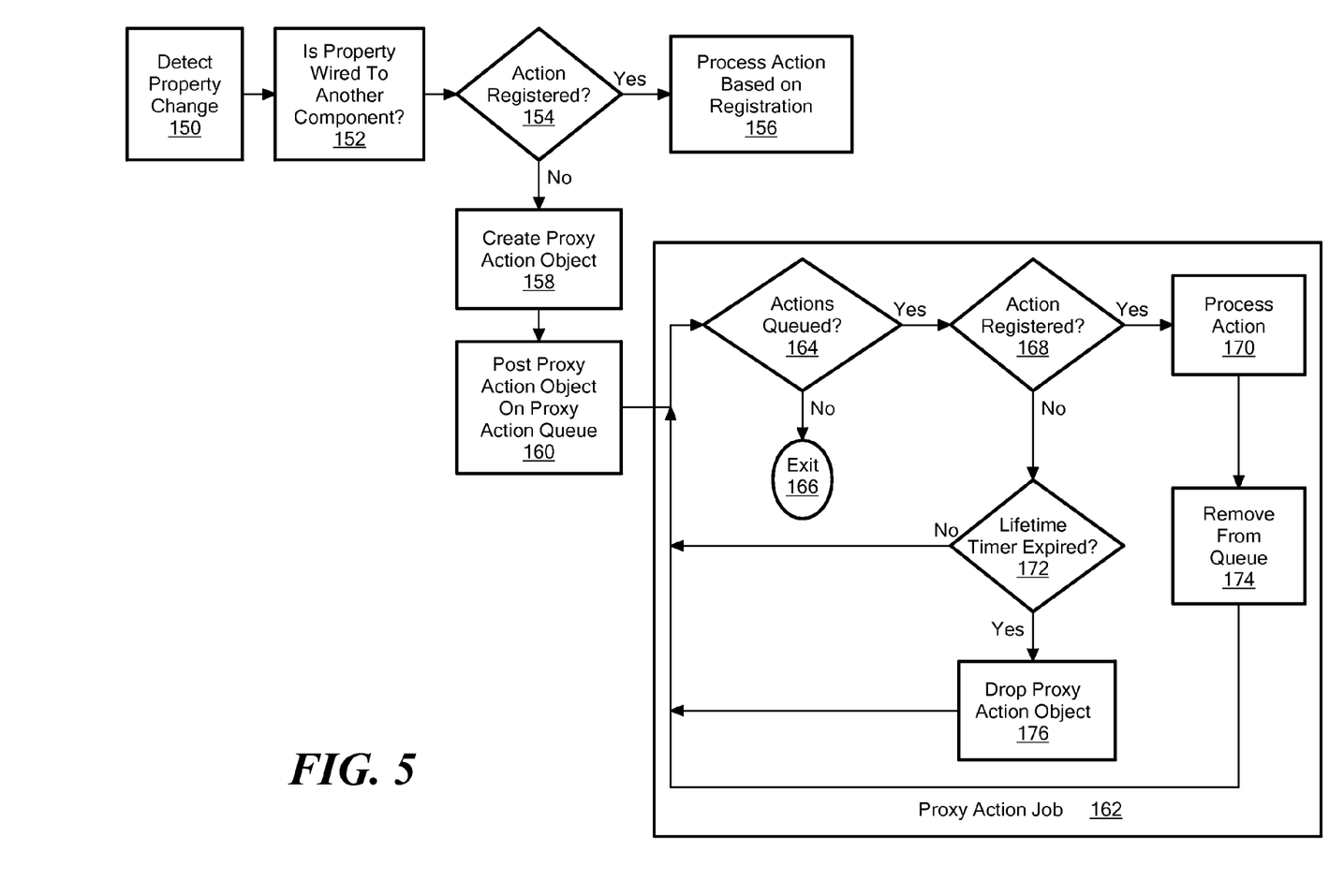
FIG. 5 is a flow chart illustrating steps performed during operation of an illustrative embodiment of the disclosed system.

FIG. 5 is a flow chart illustrating steps performed during operation of an illustrative embodiment of the disclosed system. As shown in FIG. 5, at step 150 the disclosed system detects a change in a property within a service requesting component. At step 152, the disclosed system determines if the changed property is wired to a service providing component. If so, at step 154 the disclosed system checks the broker to determine if the requested action has been registered. If so, at step 156 the disclosed system processes the requested action normally based on the registration in the broker. Otherwise, at step 158 the disclosed system creates a proxy action object representing the action request, and posts the proxy action object onto the proxy action queue. The disclosed system also triggers initialization of the service providing component, and then creates the Proxy Action Job 162 if necessary. The Proxy Action Job 162 is triggered and executed periodically (e.g. in response to expiration of an evaluation timer or the like) to check the contents of the proxy action queue and the current registrations in the broker in order to determine whether any requested actions represented by queued proxy action objects have been registered. As shown in FIG. 5, at step 164, the Proxy Action Job 162 determines if there are any proxy action objects queued onto the proxy action queue. If not, then at step 166 the Proxy Action Job 162 exits. Otherwise, at step 168, for each queued proxy action object on the proxy action queue, the Proxy Action Job 162 determines whether the requested action is registered in the broker. If so, at step 170 the Proxy Action Job 162 delivers the action request to the service providing component as if it had been delivered directly from the originally requesting service requesting component. For example, in one embodiment, as described above, once the service requesting component sends the action request, the request is stored as a proxy action object on the proxy action queue, together with the source entity identifier of the service requesting component and the target entity identifier of the service providing component. When the Proxy Action Job 162 delivers the action request to the service providing component at step 170, it writes or overwrites a source entity identifier field in a request with the original source entity identifier of the service requesting component. In this way, processing by the Proxy Action Job 162 causes the request delivered at step 170 to appear to the service providing component as if the request were received directly from the original service requesting component, and not from the Proxy Action Job 162. The Proxy Action Job 162 removes the proxy action object from the proxy action queue at step 174.

Otherwise, if the requested action for a queued proxy action object is not registered in the broker, at step 172 the Proxy Action Job 162 determines whether the lifetime timer for the queue element storing the proxy action object has expired. If so, at step 176 the Proxy Action Job 162 dequeues the queue element storing the proxy action object and drops the action request represented by the proxy action object. After each queue element in the proxy action queue is processed by the Proxy Action Job 162, the Proxy Action Job 162 exits, for example until the next expiration of the evaluation timer. In this way, execution of the Proxy Action Job 162 can be interleaved with initialization of one or more service providing components, and with one or more other applications, tasks or operations, for example as selected or initiated by a local user through a user interface of the local computer system. In this way, the disclosed system allows shared system resources to be effectively and efficiently shared across the initialization of service provider components, the execution of the Proxy Action Job 162, and such other applications, tasks or operations, and eliminates long pauses in system response while one or more service provider components initialize.

While the above description regarding illustrative embodiments of the disclosed system includes examples of specific user interface operations and/or display objects, such as may be provided using graphical buttons, menus, dialog boxes, and the like, the present invention is not limited to these specific examples. Accordingly, those skilled in the art will recognize that alternative embodiments may use any specific type or kind of user interface display object that may be appropriate to provide the specific operations described.

The disclosed system can take the form of an entirely software embodiment, an entirely hardware embodiment, or an embodiment containing both software and hardware elements. The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed.

I claim:

1. A method for automatically handling requests received for actions that are not yet registered with a broker in at least one computer, comprising:
    receiving a request for an action from a service requesting component;
    initially searching said broker for a registration of said action, automatically by said computer in response to said receiving said request for said action;
    initially determining from said initial searching of said broker for said registration that said action is not registered in said broker;
    beginning initialization of a service provider component in a first execution thread in response to said determining that said action is not registered, wherein said initialization includes said service provider component creating a registration of said action in said broker, wherein said registration indicates that said service provider component is currently available to perform said requested action;
    creating, in a memory of said computer, in response to said initially determining that said action is not registered in said broker, a proxy action object;
    storing said proxy action object on a proxy action queue in the memory of said computer;
    releasing control of at least one shared system resource in response to said storing of said proxy action object on said proxy action queue, wherein said releasing control of said at least one shared system resource allows said at least one shared system resource to be used by a second execution thread that enables a user of said computer to select another action while said service provider component is being initialized in said first execution thread;
    periodically searching, by a third execution thread while said service provider component is being initialized by said first execution thread, said broker for said registration of said action in response to said proxy action object stored on said proxy action queue;
    detecting, by said periodic searching of said broker in response to said proxy action object stored on said proxy action queue, said registration of said action in said broker;
    in response to said detecting said registration of said action in said broker, passing said proxy action object to said service provider component; and
    performing said action by said service provider component in response to receipt of said proxy action object.

2. The method of claim 1, further comprising:
    further in response to said detecting, by said periodic searching of said broker in response to said proxy action object stored on said proxy action queue, said registration of said action in said broker, removing said proxy action object from said proxy action queue.

3. The method of claim 1, further comprising:
    starting a lifetime timer for said proxy action object when said proxy action object is stored on said proxy action queue;
    detecting expiration of said lifetime timer without said periodic searching of said broker detecting said registration of said action;
    in response to expiration of said lifetime timer without detecting said registration of said action, removing said proxy action object from said proxy action queue without performing said action.

4. The method of claim 3, wherein said periodic searching of said broker further comprises:
    examining each of a plurality of proxy action objects on said proxy action queue to determine corresponding actions;
    searching said broker for registrations of each of said actions.

5. The method of claim 4, further comprising:
    starting lifetime timers for each of said plurality of proxy action objects when each of said plurality of proxy action objects are stored on said proxy action queue;
    in response to expiration of any one of said lifetime timers without detecting registration of an action for a corresponding proxy action object stored on said proxy action queue, removing said corresponding proxy action object from said proxy action queue without performing said action.

6. The method of claim 5, further comprising:
    wherein said examining each of said plurality of proxy action objects in said proxy action queue is responsive to an evaluation timer.

7. The method of claim 1, further comprising enabling said user of said computer system to gain control of a cursor in a user interface of said computer and select another application while said service provider component is being initialized.

8. The method of claim 7, wherein said proxy action object includes a unique identifier associated with a service provider component and an identifier of said action.

9. The method of claim 8, wherein said proxy action object further includes at least one parameter from said service requesting component to be passed to said service provider component.

10. The method of claim 9, wherein said service provider component comprises an electronic mail message composition component.

11. The method of claim 9, wherein said service provider component is a database replication component and said action comprises replication of said database.

12. The method of claim 9, wherein said request for said action is generated in response to a user action received through a graphical user interface.

13. The method of claim 12, wherein said user action comprises a mouse click on a user interface display object.

14. A system, including at least one computer, for automatically handling requests received for actions that are not yet registered with a broker, said computer including a computer readable memory having computer program code stored thereon for causing, when executed, said computer to perform steps comprising:
    receiving a request for an action from a service requesting component;
    initially searching said broker for a registration of said action, automatically by said computer in response to said receiving said request for said action;

initially determining from said initial searching of said broker for said registration that said action is not registered in said broker;
beginning initialization of a service provider component in a first execution thread in response to said determining that said action is not registered, wherein said initialization includes said service provider component creating a registration of said action in said broker, wherein said registration indicates that said service provider component is currently available to perform said requested action;
creating, in said memory of said computer, in response to said initially determining that said action is not registered in said broker, a proxy action object;
storing said proxy action object on a proxy action queue in said memory of said computer;
releasing control of at least one shared system resource in response to said storing of said proxy action object on said proxy action queue, wherein said releasing control of said at least one shared system resource allows said at least one shared system resource to be used by a second execution thread that enables a user of said computer to select another action while said service provider component is being initialized in said first execution thread;
periodically searching, by a third execution thread while said service provider component is being initialized by said first execution thread, said broker for said registration of said action in response to said proxy action object stored on said proxy action queue;
detecting, by said periodic searching of said broker in response to said proxy action stored on said proxy action queue, said registration of said action in said broker;
passing, in response to said detecting said registration of said action in said broker, said proxy action object to said service provider component; and
performing said action in said service provider component in response to receipt of said proxy action object.

15. A computer program product including a non-signal computer readable medium, said computer readable medium having program code stored thereon operable to cause, when executed, at least one computer to automatically handle requests received for actions that are not yet registered with a broker in said computer, by performing steps comprising:

receiving a request for an action from a service requesting component;
initially searching said broker for a registration of said action, automatically by said computer in response to said receiving said request for said action;
initially determining from said initial searching of said broker for said registration that said action is not registered in said broker;
beginning initialization of a service provider component in a first execution thread in response to said determining that said action is not registered, wherein said initialization includes said service provider component creating a registration of said action in said broker, wherein said registration indicates that said service provider component is currently available to perform said requested action;
creating, in response to said initially determining that said action is not registered in said broker, a proxy action object;
storing said proxy action object on a proxy action queue;
releasing control of at least one shared system resource in response to said storing of said proxy action object on said proxy action queue, wherein said releasing control of said at least one shared system resource allows said at least one shared system resource to be used by a second execution thread that enables a user of said computer to select another action while said service provider component is being initialized in said first execution thread;
periodically searching, by a third execution thread while said service provider component is being initialized by said first execution thread, said broker for said registration of said action in response to said proxy action object stored on said proxy action queue;
detecting, by said periodic searching of said broker in response to said proxy action stored on said proxy action queue, said registration of said action in said broker;
passing, in response to said detecting said registration of said action in said broker, said proxy action object to said service provider component; and
performing said action in said service provider component in response to receipt of said proxy action object.

\* \* \* \* \*